2,858,329
Patented Oct. 28, 1958

2,858,329

PREPARATION OF BIS-DILOWERALKYLAMINO-ALKYL LOWERALKYL DICARBOXYLATES

Willard C. Braaten and Allen G. Debus, Waukegan, and Gregory A. Bauer, North Chicago, Ill., assignors to Abbott Laboratories, North Chicago, Ill., a corporation of Illinois No Drawing. Application November 30, 1955
Serial No. 550,220

9 Claims. (Cl. 260—485)

This invention relates to a new method of direct esterification of acids or anhydrides with amino alcohols and more particularly to a process of pyrolytic esterification of dicarboxylic acids and the corresponding anhydrides thereof with tertiary amino alcohols to form diesters.

The novel reaction of this invention differs from the usual condensation of an anhydride with an alcohol in the presence of a catalyst such as sulfuric acid because the amino group of the amino alcohol introduces a basic element into the monoester formed as an intermediate. One skilled in the art would expect the formation of an internal salt between the acidic group and the basic group of the intermediate monoester or half-acid ester. Such internal salts are undesirable where the diester is the intended product.

It is a principal object of this invention to provide an improved process of making a diester of a dicarboxylic acid or the corresponding anhydride and a tertiary amino alcohol.

It is unusual and surprising to find that an anhydride of a dicarboxylic acid such as succinic anhydride or the acid itself could be di-esterified with a tertiary amino alcohol, such as dimethylaminoethanol, in good yields (70%–90%) without employing a catalyst. The expected internal salt of the amino group and the carboxyl group of the half-acid ester is thought to occur as an intermediate in the reaction and dissociates under the conditions used and in the presence of excess amino alcohol with the formation of the diester as follows:

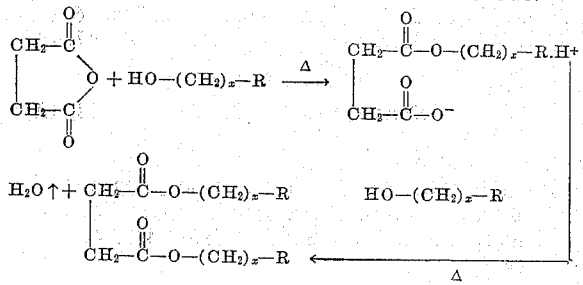

wherein $(CH_2)_x$ is lower alkylene, and R is a diloweralkylamino group or N-heterocyclic group attached through the nitrogen to the alkylene group.

The water may be removed by distillation as it is formed in the reaction. Ordinarily, it is convenient to remove water as an azeotrope or constant boiling mixture with an excess of the amino alcohol, or by forming an azeotrope with an inert, substantially water-immiscible solvent. By "inert" is meant that the solvent does not react with the anhydride nor the amino alcohol but is useful in forming an azeotrope with water. The boiling point of a suitable solvent must not be substantially higher than the boiling point of the lower boiling of the two principal reactants, usually the amino alcohol. Naturally the boiling point of the solvent-water azeotrope or constant boiling mixture must be lower than that of the lower boiling of the principal reactants, usually the amino alcohol.

While it is possible to calculate the amount of water formed in the reaction and the amount of solvent that will be required to remove it, it is usually more desirable to work with smaller volumes of liquids and to employ conventional techniques of collecting the distilled azeotrope, separating the water-immiscible solvent and continuously returning said solvent to the reactor. This procedure for removing water employs inert, substantially water-immiscible solvents such as benzene, toluene, xylene, amyl acetate and suitable petroleum hydrocarbons.

It will be apparent that the tertiary amino alcohol reactant has the qualities of a water-removing agent but since it may be water miscible, must use an excess over the stoichiometric amount, sufficient to remove the water.

The reaction will normally proceed best at or near the boiling point of the lower boiling of the principal reactants, usually the amino alcohol and may require a considerable period of time of from 6 to 24 hours.

The esters of this invention are useful as intermediates in the preparation of physiologically active compounds such as succinylcholine chloride, as will be seen in greater detail in the examples.

Dicarboxylic acids or anhydrides thereof are employed as one of the essential reactants. It is known, of course, that dicarboxylic acids form the corresponding anhydrides upon heating. For example, one may employ such acids or anhydrides as succinic, glutaric, phthalic, maleic and the like.

The tertiary amino alcohols are the other essential reactant and from this group one may use such representative compounds as dimethylaminoethanol, diethylaminoethanol, dimethylaminopropanol and like di-lower alkylamino alkanols. The heterocyclicaminoalkanols may also be used such as the piperidinoalkanols, the pyrrolidinoalkanols, the piperazinoalkanols and the morpholinoalkanols.

The esters may be converted into the quaternary ammonium salts thereof by conversion of the amino nitrogen to the quaternary form. This is accomplished in conventional fashion by contacting the tertiary amine with a lower alkyl halide such as methyl chloride or a diloweralkyl sulfate such as dimethylsulfate. Details of this conversion will be found in the examples.

The following examples are presented in order to describe the invention more clearly but it should be understood that the examples are not intended to be a limitation on the invention in any way.

*Example I*

100 grams of succinic anhydride and 500 grams of dimethylaminoethanol are heated together in a 1-liter flask. The water formed in the reaction is distilled off as it is formed. At the completion of the reaction all of the remaining water and the excess dimethylaminoethanol are distilled off and the remaining product is distilled at 5 mm. Hg. A 79% yield of a material having a refractive index of $N_D^{25}$ 1.4488 is obtained. This material is bis-dimethylaminoethyl succinate.

*Example II*

100 grams of succinic anhydride and 300 grams of dimethylaminoethanol are mixed and 60 ml. of benzene is added. The mixture is heated to 135° C.–145° C. for 12 to 18 hours with the continuous removal of water. When the reaction nears completion, the excess solvent and excess dimethylaminoethanol are distilled under vacuum. The crude bis-dimethylaminoethyl succinate is then distilled at 2–5 mm. and a yield of relatively pure bis-dimethylaminoethyl succinate on the order of 60%–70% is obtained.

*Example III*

Charge 21 gallons of anhydrous dimethylaminoethanol to a 30-gallon still equipped with a fractionating column and a water separator. Slowly add 50 pounds of succinic anhydride with good agitation. Slow addition and good agitation are needed to avoid local heating due to the rapid formation of the mono-ester. Charge 3 gallons of benzene, and begin heating to reflux. The condensate from the condenser is collected in a water separator. The benzene layer from the separator is continuously returned to the top of the fractionating column. The pot temperature should be maintained between 135° C.–145° C. by the addition to or removal of benzene from the batch. Below 135° C. the reaction does not proceed satisfactorily. Above 145° C. decomposition becomes excessive. The reaction is allowed to proceed for 18 hours at 135° C.–145° C. After 18 hours about 70% of the theoretical amount of water will be removed, but the reaction will have slowed down enough to be impractical to continue. Cool the batch quickly after the reaction is over. Remove the benzene and unreacted dimethylaminoethanol under vacuum. Do not allow the pot temperature to go above about 125° C., because of decomposition. A vacuum of 28 inches and a pot temperature of 125° C. will effectively remove all the low boil and leave a residue of crude ester.

Charge 80 gallons of 99% isopropyl alcohol to a still equipped with an agitator and gas addition tube. Charge the crude ester and 18 pounds of water. Heat to 40° C. and begin gassing with methyl chloride. Continue gassing until 55 pounds of gas are added.

During gassing, maintain the pot temperature between 40–50° C. Cool immediately after gassing, and agitate for 8 hours. Centrifuge the crude succinylcholine chloride and wash with 10 gallons of isopropyl alcohol. Dry in a vacuum drier for 48 hours at 50° C. Yields up to 65% of succinylcholine chloride, a well-known muscle relaxant, are obtained.

Others may practice this invention in any of the numerous ways which will be suggested to one skilled in the art upon a reading of this disclosure. All such practice of the invention is considered to be covered hereby, provided it falls within the scope of the appended claims.

We claim:

1. The method of making diesters which comprises heating to reflux conditions a lower alkyl dicarboxylic acid anhydride with at least a stoichiometric amount of a diloweralkylamino-lower alkanol, removing the water formed in the reaction and recovering the diester.

2. The method of making diesters which comprises heating to reflux conditions a lower alkyl dicarboxylic acid anhydride with at least a stoichiometric amount of a diloweralkylamino-lower alkanol, distilling the water formed in the reaction and recovering the diester.

3. The method of making diesters which comprises heating to reflux conditions a lower alkyl dicarboxylic acid anhydride with at least a stoichiometric amount of a diloweralkylamino-lower alkanol in the presence of a water-removing, inert solvent, distilling off the water formed in the reaction, and recovering the diester.

4. The method of making diesters which comprises heating to reflux conditions a lower alkyl dicarboxylic acid anhydride with an excess of a dilower-alkylamino-lower alkanol over the stoichiometric amount, distilling off the water formed in the reaction, and recovering the diester.

5. The method of making bis-dimethylaminoethyl succinate which comprises heating to reflux conditions succinic anhydride and at least a stoichiometric amount of dimethylaminoethanol, distilling the water formed in the reaction, and recovering the diester.

6. The method of making bis-dimethylaminoethyl succinate which comprises heating succinic anhydride and at least a stoichiometric amount of dimethylaminoethanol to reflux conditions in the presence of a water-removing, inert solvent, distilling the water formed in the reaction, and recovering the diester.

7. The method of making a bis-dimethylaminoethyl succinate which comprises heating to reflux conditions succinic anhydride and an excess of dimethylaminoethanol over the stoichiometric amount, distilling off the water formed in the reaction, and recovering the diester.

8. The method of making succinylcholine chloride which comprises heating one mole of succinic anhydride with about two moles of dimethylaminoethanol in the presence of a water-removing, inert solvent at about 135° C.–145° C., distilling off the water formed in the reaction, directly mixing the crude diester thus formed with a lower alkyl halide at 40° C.–50° C., and recovering the succinylcholine chloride.

9. The method of making succinylcholine chloride which comprises heating one mole of succinic anhydride with about two moles of dimethylaminoethanol in the presence of benzene for 12 to 18 hours at about 135° C.–145° C., distilling off the water formed in the reaction as a benzene-water azeotrope, and directly gassing the crude diester thus formed with methyl chloride at 40° C.–50° C., and recovering the succinylcholine chloride.

References Cited in the file of this patent

UNITED STATES PATENTS

| 2,439,074 | Caldwell | Apr. 6, 1948 |
| 2,669,577 | Cusic | Feb. 16, 1954 |
| 2,731,493 | Aeschlimann et al. | Jan. 17, 1956 |

FOREIGN PATENTS

| 78,264 | Denmark | Oct. 18, 1954 |

OTHER REFERENCES

Rosnati: Gazz. Chim. Ital. 80 (1950), 672–3.
Fuoss et al.: J. Am. Chem. Soc. 73 (1951), 269–73.
Phillips: J. Am. Chem. Soc. 75 (1953), 4725–7.